(12) United States Patent
Kawakubo

(10) Patent No.: US 9,223,427 B2
(45) Date of Patent: Dec. 29, 2015

(54) PORTABLE TERMINAL DEVICE AND METHOD FOR RELEASING KEYLOCK FUNCTION OF PORTABLE TERMINAL DEVICE

(75) Inventor: Noriko Kawakubo, Kochi (JP)

(73) Assignee: KYOCERA Corporation, Kyoto (JP)

( * ) Notice: Subject to any disclaimer, the term of this patent is extended or adjusted under 35 U.S.C. 154(b) by 245 days.

(21) Appl. No.: 13/989,134

(22) PCT Filed: Nov. 24, 2011

(86) PCT No.: PCT/JP2011/076981
§ 371 (c)(1),
(2), (4) Date: Jul. 9, 2013

(87) PCT Pub. No.: WO2012/070600
PCT Pub. Date: May 31, 2012

(65) Prior Publication Data
US 2013/0285983 A1    Oct. 31, 2013

(30) Foreign Application Priority Data
Nov. 26, 2010    (JP) ................................. 2010-264176

(51) Int. Cl.
*G06F 3/041*    (2006.01)
*G06F 3/0488*    (2013.01)
(Continued)

(52) U.S. Cl.
CPC ............ *G06F 3/0412* (2013.01); *G06F 1/1624* (2013.01); *G06F 1/1647* (2013.01);
(Continued)

(58) Field of Classification Search
CPC ............ H04M 1/0216; H04M 1/0237; H04M 1/0214; H04M 2250/12; H04M 2250/22; H04M 2250/52; H04M 2250/16; H04M 1/0245; H04M 1/72561; H04M 1/2755; H04M 1/72522; H04M 1/23; H04M 1/72519; H04M 1/0235
See application file for complete search history.

(56) References Cited

U.S. PATENT DOCUMENTS 7,340,271 B2 *    3/2008    Mirza et al. ................. 455/550.1
8,174,503 B2 *    5/2012    Chin ............................. 345/173
(Continued)

FOREIGN PATENT DOCUMENTS

JP    2006-107194 A    4/2006
JP    2008-243149 A    10/2008
(Continued)

OTHER PUBLICATIONS

International Preliminary Report on Patentability (with English translation) for related international application No. PCT/JP2011/076981, issued on May 28, 2013, in 11 pages.
(Continued)

*Primary Examiner* — Nalini Mummalaneni
(74) *Attorney, Agent, or Firm* — Procopio, Cory, Hargreaves & Savitch, LLP

(57) ABSTRACT

A cellular phone includes a first display, a second display, a first touch sensor which detects an input to the first display, a second touch sensor which detects an input to the second display, a CPU which sets and releases a keylock function for disabling the inputs, and a memory which stores a releasing condition of the keylock function including a combination of an input detected by the first touch sensor and an input detected by the second touch sensor. The CPU releases the keylock function with respect to at least one of the first touch sensor and the second touch sensor when inputs detected by the touch sensors and match with the releasing condition stored in the memory while the keylock function is being set.

7 Claims, 9 Drawing Sheets

(51) Int. Cl.
*G06F 1/16* (2006.01)
*H04M 1/67* (2006.01)
*H04M 1/02* (2006.01)

(52) U.S. Cl.
CPC .......... *G06F3/0488* (2013.01); *G06F 3/04886* (2013.01); *H04M 1/67* (2013.01); *H04M 1/0235* (2013.01); *H04M 2250/16* (2013.01); *H04M 2250/22* (2013.01)

(56) References Cited

U.S. PATENT DOCUMENTS

2005/0079896 A1* 4/2005 Kokko et al. .................. 455/566
2007/0150842 A1 6/2007 Chaudhri et al.
2010/0141575 A1* 6/2010 Ohdachi et al. ............... 345/156
2011/0209058 A1* 8/2011 Hinckley et al. ............... 715/702

FOREIGN PATENT DOCUMENTS

JP 2009-005039 A 1/2009
JP 2009-239477 A 10/2009

OTHER PUBLICATIONS

International Search Report dated Dec. 20, 2011, issued for International Application No. PCT/JP2011/076981.

* cited by examiner

PORTABLE TERMINAL DEVICE AND METHOD FOR RELEASING KEYLOCK FUNCTION OF PORTABLE TERMINAL DEVICE

TECHNICAL FIELD

The present invention relates to a portable terminal device such as a cellular phone, a PDA (Personal Digital Assistant) and so forth.

BACKGROUND ART

Conventionally, a portable terminal device is provided with a keylock function to disable inputs to key buttons or touch panels. If such keylock function is set with the portable terminal device, a user uses the portable terminal device after releasing the keylock function.

With such portable terminal device, for example, when a set key button is kept pressed for more than a set period, the keylock function is released.

SUMMARY OF INVENTION

Technical Problem

In the above construction, a situation that something accidentally keeps pressing against the set key button while the portable terminal device is in a bag may happen. In such a case, despite the user's intention, the keylock function may likely be released.

The present invention is done in light of the above technical problem, and the objections are to provide a portable terminal device which can release a keylock function according to a user's intention and to provide a method for releasing the keylock function.

Solution to Problem

A first configuration of the present invention relates to a portable terminal device. The portable terminal device of the present invention includes a first display module, a second display module, a first detecting module which detects an input to the first display module, a second detecting module which detects an input to the second display module, a function control module which sets and releases a keylock function for disabling the inputs, and a storage module which stores a releasing condition, for releasing the keylock function, including a combination of an input detected by the first detecting module and an input detected by the second detecting module. Then, the function control module releases the keylock function with respect to at least one of the first detecting module and the second detecting module when an input detected by the first detecting module and an input detected by the second detecting module match with the releasing condition stored in the storing module while the keylock function is being set.

A second configuration of the present invention relates to a method for releasing a keylock function of a portable terminal device including a first display module, a second display module, a first detecting module which detects an input to the first display module and a second detecting module which detects an input to the second display module. The method for releasing the keylock function of the present configuration includes a step of, in a state that a keylock function for disabling inputs to the first display module and the second display module is set, releasing the keylock function with respect to at least one of the first detecting module and the second detecting module, when a combination of an input detected by the first detecting module and an input detected by the second detecting module matches with a previously set releasing condition.

Advantageous Effects of Invention

According to the present invention, a portable terminal device which can release a keylock function according to the user's intention and a method for releasing the keylock function can be provided.

An advantage or significance of the present invention will become clearer from the description of embodiment, as shown below. However, the following description of embodiment is simply one illustration in embodying the present invention, and the present invention is not limited by what is described in the following description of embodiment.

However, the drawings are entirely used for an explanation for an example of the embodiment, and not intended to limit a scope of the present invention.

DESCRIPTION OF EMBODIMENTS

In the following, the embodiments of the present invention will be described with reference to the drawings.

<A Construction of a Cellular Phone>

Figure 1:
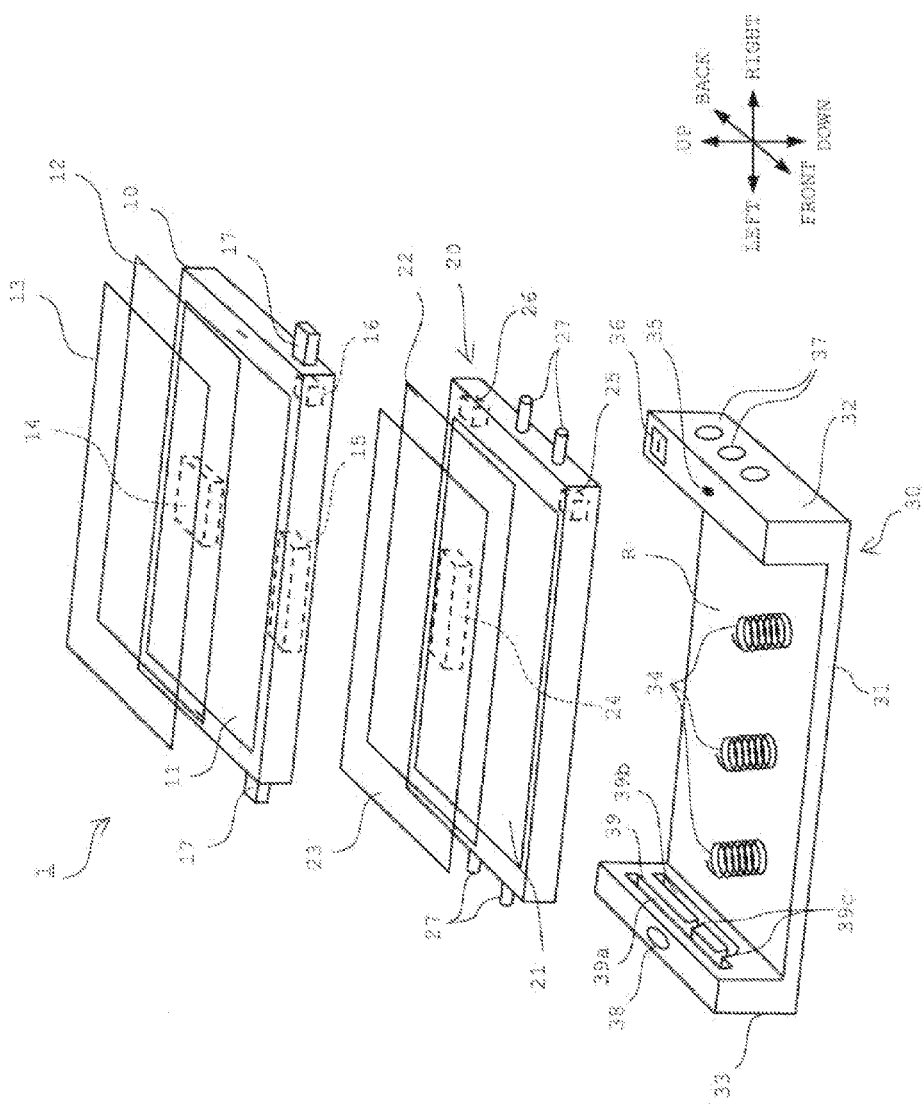
FIG. 1 is a diagram showing an appearance configuration of a cellular phone according to an embodiment.

FIG. 1 is an exploded perspective view showing a configuration of a cellular phone 1. The cellular phone 1 corresponds to a portable terminal device. The cellular phone 1 is composed of a first cabinet 10, a second cabinet 20 and a holder 30 which holds the first cabinet 10 and the second cabinet 20.

The first cabinet 10 has horizontally long rectangular solid shape. A first touch panel is arranged on the first cabinet 10. The first touch panel includes a first display 11, a first touch sensor 12 and a first transparent cover 13.

The first display 11 corresponds to the first display module, and displays the first screen on the first display surface 11a1. The first display 11 is composed of a first liquid crystal panel 11a and a first backlight 11b which illuminates the first liquid crystal panel 11a. The first display surface 11a1 is provided at the front of the first liquid crystal panel 11a. The first touch sensor 12 is overlapped on the first display 11. The first backlight 11b includes one or more light sources.

The first touch sensor 12 corresponds to the first detecting module. The first touch sensor 12 detects that a user input to the first screen displayed on the first display surface 11a1 and where he input at. The first touch sensor 12 is a transparent rectangle shaped sheet and covers the first display surface 11a1 of the first display 11. The first touch sensor includes a first transparent electrode and a second transparent electrode arranged in a matrix state. By detecting a change in capacitance between these transparent electrodes, the first touch sensor 12 detects a position on the first display surface 11a1 touched by the user and outputs a positional signal according to the position. The user touches the first display surface 11a1 means, for example, that with a contact member such as a finger, a pen, etc., the user pushes, rubs, or draws a figure or a character, etc., on the first display surface 11a1. Touching the first display surface 11a1 actually means to touch an area reflecting the first screen in later explained first transparent cover 13.

The first transparent cover 13 is overlapped on the first touch sensor 12. The first transparent cover 13 covers the first touch sensor 12 and appears on the front of the first cabinet 10.

In the first cabinet 10, a camera module 14 is arranged at a position slightly back of a center. A lens window for capturing a subject image in the camera module 14 is provided on the undersurface of the first cabinet 10.

In the first cabinet 10, a magnet 15 is arranged at a center position in the vicinity of the front face, and a magnet 16 is arranged at the right front corner.

In addition, the protruding portions 17 are provided on the right and left sides of the first cabinet 10.

The second cabinet 20 has a horizontally long rectangular solid shape and has almost the same shape and size as the first cabinet 10. A second touch panel is arranged on the second cabinet 20. The second touch panel includes a second display 21, a second touch sensor 22 and a second transparent cover 23.

The second display 21 corresponds to the second display module, and displays the second screen on the second display surface 21a1. The second display 21 is composed of a second liquid crystal panel 21a and a second backlight 21b which illuminates the second liquid crystal panel 21a. The second display surface 21a1 is provided at the front of the second liquid crystal panel 21a. The second backlight 21b includes one or more light sources. The first display 11 and the second display 21 may be composed of other display elements such as an organic electroluminescence (EL), etc.

The second touch sensor 22 corresponds to the second detecting module. The second touch sensor 22 detects that a user input to the second screen displayed on the second display surface 21a1 and where he input at. The second touch sensor 22 is overlapped on the second display 21. The second touch sensor 22 covers the second display 21, and the second transparent sheet 23 is overlapped on the second touch sensor 22. The construction of the second touch sensor 22 is the same as the construction of the first touch sensor 12. The user touches the second display surface 21a1 means, actually, that the user touches an area reflecting the second screen in later explained second transparent cover 23 with a finger, etc.

The second transparent cover 23 covers the second touch sensor 22 and appears on the front of the second cabinet 20.

In the second cabinet 20, a magnet 24 is arranged at a center position in the vicinity of a rear face. This magnet 24 and the magnet 15 of the first cabinet 10 are constructed to attract each other by magnetic force in an open state. The open state is, as described later, a state that the first cabinet 10 and the second cabinet 20 being arranged to construct a big screen by the displays 11 and 21 of the two. If a magnetic force of one of the magnets 24 and 15 is strong enough, the other magnet can be replaced with a magnetic body.

In the second cabinet 20, a close sensor 25 is arranged at the right front corner and an open sensor 26 is arranged on the right back corner. These sensors 25 and 26 are composed of a hall IC and the like, for example, and output a detection signal in response to magnetic force of the magnet 16. As described later, in the close state where the first cabinet 10 and the second cabinet 20 are overlapped to each other, since the magnet 16 of the first cabinet 10 is in proximity to the close sensor 25, an ON signal is output from the close sensor 25. In contrast, when the first cabinet 10 and the second cabinet 20 are aligned in the front and back, the magnet 16 of the first cabinet 10 is in proximity to the open sensor 16. Thus, an ON signal is output from the open sensor 26.

Further, two respective shaft portions 27 and 27 are provided on both sides of the second cabinet 20.

The holder 30 is composed of a bottom plate portion 31, a right holding portion 32 formed on a right edge part of the bottom plate portion 31, and a left holding portion 33 formed on a left edge part of the bottom plate portion 31.

Three coil springs 34 are arranged on the bottom plate portion 31 so that the coil springs 34 line in a horizontal direction. In a state where the second cabinet 20 is attached to the holder 30, the coil springs 34 abut an underside of the second cabinet 20 and give force to push up the second cabinet 20.

On an upper surface of the right holding portion 32, a microphone 35 and a power key 36 are arranged. A speaker 38 is arranged on an upper surface of the left holding portion 33.

A plurality of hard keys 37 are arranged on an outer surface of the right holding portion 32. When a predetermined hard key 37 is pressed, a power saving function for stopping an operation of the cellular phone 1 temporarily is released, and the operation of the cellular phone 1 restarts.

On inner sides of the right holding portion 32 and the left holding portion 33, guiding grooves 39 (only that on the left holding portion 33 is shown) are formed. The guiding grooves 39 are composed of an upper groove 39a, a lower groove 39b, and two vertical grooves 39c. The upper groove 39a and the lower groove 39b extend in a forward-backward direction, and the vertical grooves 39c extend upward and downward so as to connect the upper groove 39a and the lower groove 39b.

When the cellular phone 1 is assembled, the shaft portions 27 are inserted into the lower grooves 39b of the guiding grooves 39, and the second cabinet 20 is arranged in a containing region R of the holder 30. The protruding portions 17 are inserted into the upper grooves 39a of the guiding grooves 39, the first cabinet 10 is arranged on the second cabinet 20, and the first cabinet 10 is fitted in the containing region R of the holder 30.

In this manner, the first cabinet 10 and the second cabinet 20 are contained in a vertically overlapped state into the containing region R surrounded by the bottom plate portion 31, the right holding portion 32, and the left holding portion 33. In this state, the first cabinet 10 can be slid forward and backward by being guided by the upper grooves 39a. The second cabinet 20 can be slid forward and backward by being guided by the lower groove 39b. When the second cabinet 20 moves forward and the shaft portions 27 reach the position of the vertical grooves 39c, the second cabinet 20 is guided by the vertical grooves 39c and becomes vertically slidable.

Figure 2:
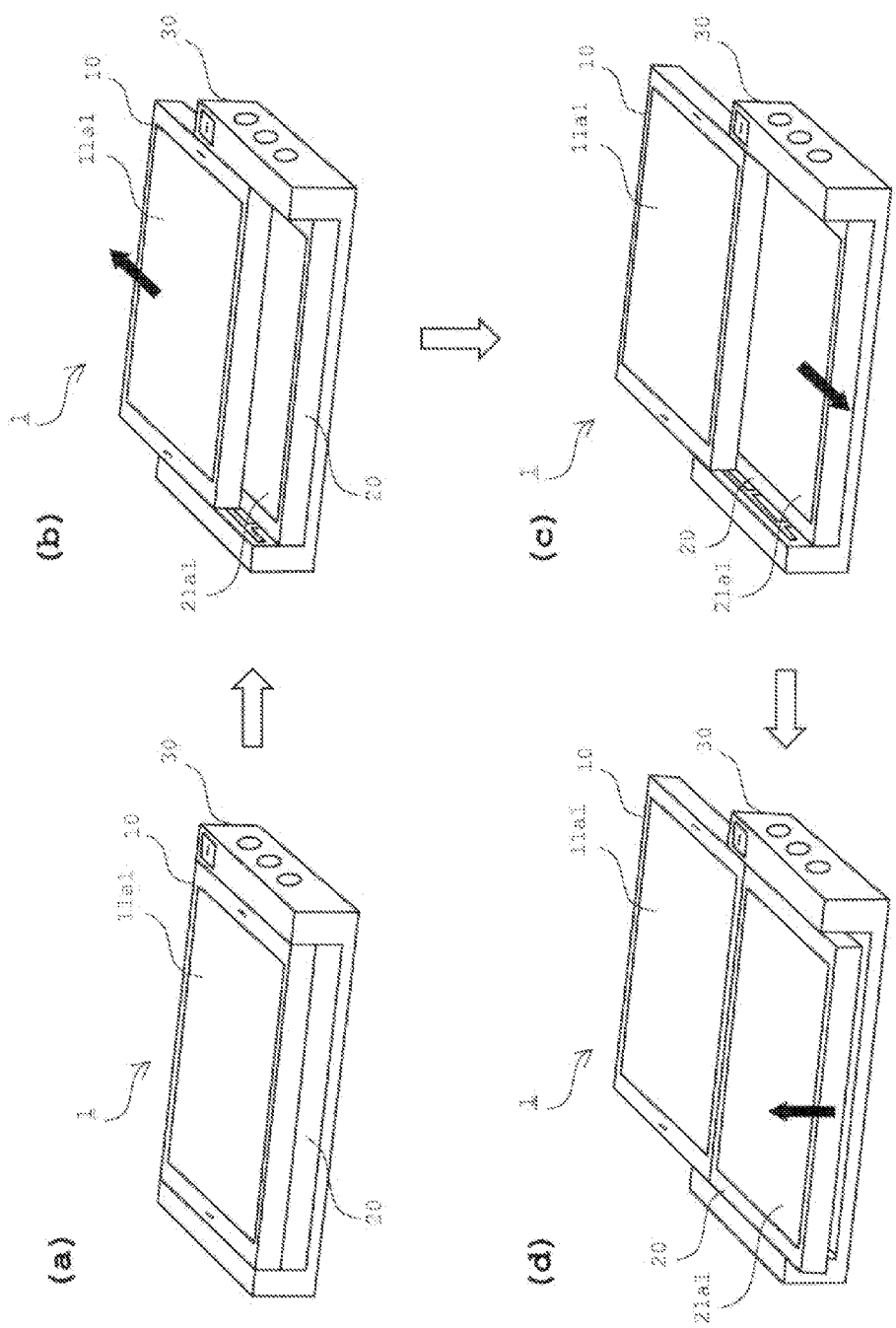
FIGS. 2 (a) to 2 (d) are diagrams for describing switching a state of the cellular phone according to the embodiment.

FIGS. 2 (a) to 2 (d) are diagrams for illustrating how the cellular phone 1 is switched from a closed state to an open state.

The closed state shown in FIG. 2 (a) is a state where the first cabinet 10 is overlapped on the second cabinet 20 in which the cellular phone 1 is folded. The second display surface 21a1 is masked, and only the first display surface 11a1 is exposed to the external.

As shown in FIG. 2(b), the first cabinet 10 is moved backward by a user, and as shown in FIG. 2(c), the second cabinet 20 is pulled forward. When the second cabinet 20 does not overlap the first cabinet 10 at all, the shaft portions 27 and 27 as shown in FIG. 1 reach the position of the vertical grooves 39c. Since the shaft portions 27 and 27 move along the vertical grooves 39c, the second cabinet 20 can move up and down. The second cabinet 20 rises due to elastic force of the coil springs 34 and attraction between the magnet 15 and the magnet 24.

As shown in FIG. 2(d), the second cabinet 20 is closely juxtaposed to the first cabinet 10, and the second display surface 21a1 of the second cabinet 20 becomes flush with the first display surface 11a1. Because of this, the cellular phone 1 is switched to the open state. In the open state, the first cabinet 10 and the second cabinet 20 are opened up, and both the first display surface 11a1 and the second display surface 21a1 are exposed to the external.

Figure 3:
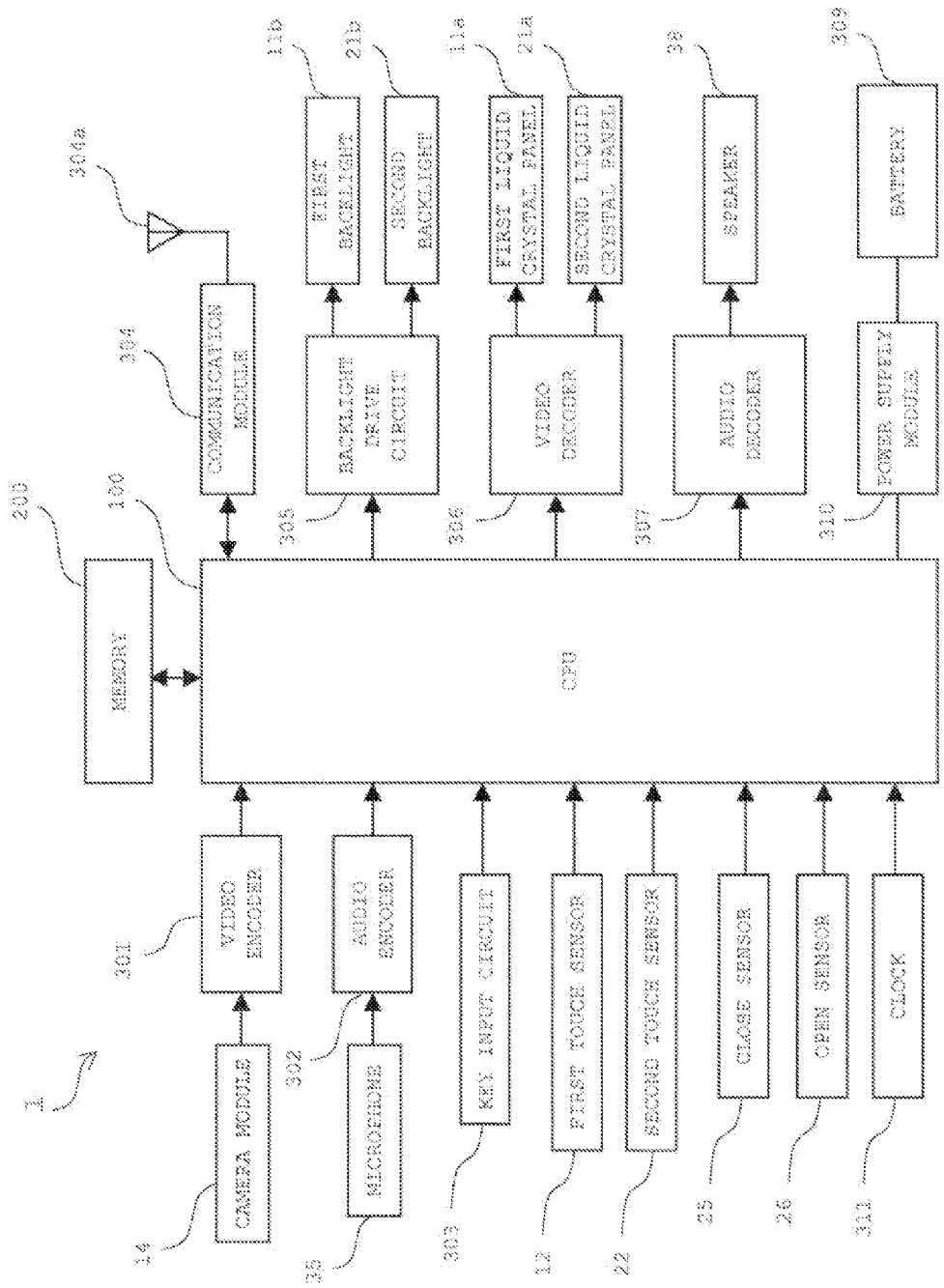
FIG. 3 is a block diagram showing an entire configuration of the cellular phone according to the embodiment.

FIG. 3 is a block diagram showing an overall configuration of the cellular phone 1. In addition to the components described above, the cellular phone 1 of the embodiment includes a CPU 100, a memory 200, a video encoder 301, an audio encoder 302, a key input circuit 303, a communication module 304, a backlight drive circuit 305, a video decoder 306, an audio decoder 307, a battery 309, a power supply module 310 and a clock 311.

The camera module 14 has an image pickup device such as CCD, etc. The camera module 14 digitalizes an imaging signal output from the image pickup device, subjects the imaging signal to various corrections such as gamma correction, etc., and outputs the imaging signal to the video encoder 301. The video encoder 301 encodes the imaging signal from the camera module 14 and outputs the imaging signal to the CPU 100.

The microphone 35 converts collected sound into an audio signal and outputs the audio signal to the audio encoder 302. The audio encoder 302 not only converts the analog audio signal from the microphone 35 into a digital audio signal, but also encodes and outputs the audio signal to the CPU 100.

When the power supply key 36 or either key of the operation keys 37 is pressed, the key input circuit 303 outputs an input signal corresponding to the key to the CPU 100.

The communication module 304 converts information from the CPU 100 into a radio signal and transmits the radio signal to base station via an antenna 304a. The communication module 304 converts a radio signal received via the antenna 304a into information and outputs that information to the CPU 100.

The backlight drive circuit 305 applies a voltage based on a control signal from the CPU 100 to the first backlight 11b and the second backlight 21b. The first backlight 11b turns on by a voltage from the backlight drive circuit 305 and illuminates the first liquid crystal panel 11a. The second backlight 21b turns on by a voltage from the backlight drive circuit 305, and illuminates the second liquid crystal panel 21a.

The video decoder 306 converts image information from the CPU 100 into image signals which can be displayed on the first liquid crystal panel 11a and the second liquid crystal panel 21a. Then, the video decoder 306 outputs the converted image signals to the liquid crystal panels 11a and 21a. The first liquid crystal panel 11a displays a first screen corresponding to the image signal on the first display surface 11a1. The second liquid crystal panel 21a displays a second screen corresponding to a video signal on the second display surface 21a1.

The audio decoder 307 decodes an audio signal and a tone signal of various notifying sounds such as a ring tone or alarm sound, etc., from the CPU 100, further converts the audio signal and the tone signal into an analog audio signal and an analog tone signal, and outputs the signals to the speaker 38. The speaker 38 reproduces the audio signal, ring tone, etc., from the audio decoder 307.

The battery 309 is for supplying electric power to the CPU 100 and each module other than the CPU 100, and made of a secondary battery. The battery 309 is connected to the power supply module 310.

The power supply module 310 converts voltage of the battery 309 to the amount of voltage necessary for each module and supplies the voltage to each module. The power supply module 310 supplies electric power fed via an external power supply to the battery 309 to charge the battery 309.

The clock 311 measures a length of time and outputs to the CPU 100 a signal corresponding to the measured length of time.

The memory 200 includes ROM and RAM. A control program for providing the CPU 100 with a control function is stored in the memory 200. Data of images taken with the camera module 14, information captured from the external via the communication module 304 or information input by each touch sensor 12 and 22 is saved in a predetermined file format in the memory 200.

In the memory 200, conditions to release the keylock function to be explained later are stored. The conditions to release the keylock function can be set in advance or can be set by the user. The releasing conditions include combinations of an input detected by the first touch sensor 12 and an input detected by the second touch sensor 22.

In the memory 200, image-position corresponding information is stored. The image-position corresponding information is the information matching contents shown by images included in each screen and positions where these images are displayed. The images include drawings, characters, and so on. For example, the images are icons, buttons, tapping areas shown in FIG. 4(b), areas including characters shown in FIG. 6, etc. For example, when each screen including the tapping areas shown in FIG. 4(b) is being displayed on each display surface 11a1 and 21a1, the image-position corresponding information related to the tapping area images is stored in the memory 200. The images of the tapping areas show valid areas which accept inputs by a touch to release the keylock function. In the image-position corresponding information, positions where the images of the tapping areas on each screen are shown by coordinates, etc. As shown in FIG. 4(a), when the second screen including a keylock setting button is displayed on the second display surface 21a1, the image-position corresponding information related to the keylock setting button is stored in the memory 200. Contents shown by the keylock setting button is to execute a processing of setting the keylock function. In the image-position corresponding information, the position where the keylock setting button is displayed on the second screen is shown by the coordinates, etc.

Based on an input signal from a key input circuit 303 and positional signals from each touch sensor 12 and 22, and according to the control program, the CPU 100 activates a camera module 14, a microphone 35, a communication module 304, liquid crystal panels 11a and 21a, a speaker 38, etc.

Because of this, the CPU 100 executes various applications such as a telephone call function, an E-mail function, a keylock function, etc.

The CPU 100 receives positional signals from each touch sensor 12 and 22. The CPU 100 refers the image-position corresponding information and seeks a content that the image is showing from the received positional signal. For this reason, if the position according to the positional signal is included in the image range of a tapping area, the CPU 100 determines that the positional signal corresponds to an input for releasing the keylock function. Then, the CPU 100 determines whether the input for releasing the keylock function matches the condition to release the keylock function stored in the memory 200 or not.

When the CPU 100 determines that input information via each touch sensor 12 and 22 matches the keylock function releasing condition, as a function control module, the CPU 100 releases the keylock function of one or both of the first touch sensor 12 and the second touch sensor 22.

The CPU 100 sets the keylock function as the function control module according to the input information from the user and information from software.

Figure 4:
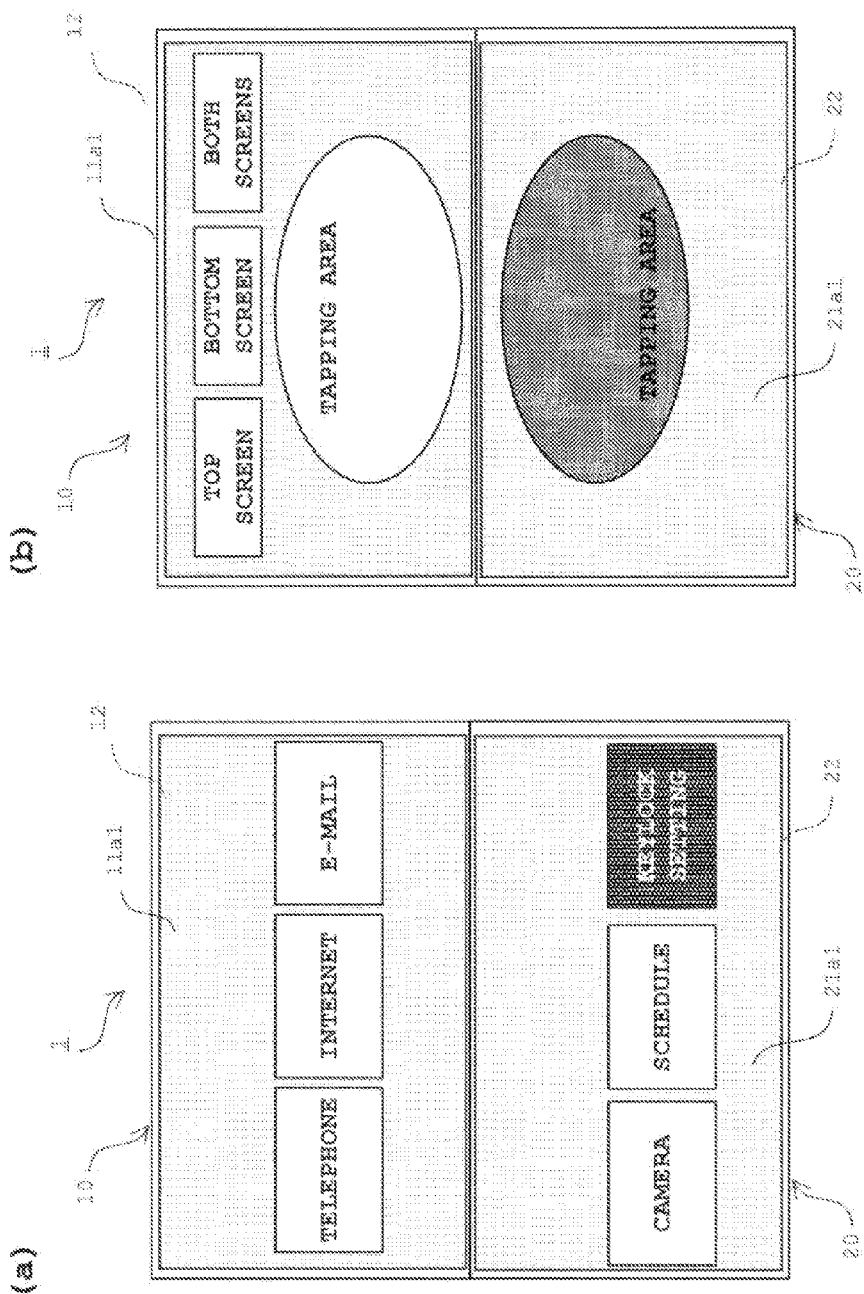
FIGS. 4 (a) and 4 (b) are diagrams showing screens displayed on each display surface according to the embodiment.

For instance, as shown in FIG. 4 (*a*), when the user touches the keylock setting button displayed on the second display surface 21a1, the second touch sensor 22 outputs a positional signal corresponding to the touched position to the CPU 100. The CPU 100 receives the positional signal from the second touch sensor 22, and specifies the contents of the image corresponding to the positional signal from the image-position corresponding information of the memory 200. In this case, since the position shown by the positional signal is included in a range of the keylock setting button, the CPU 100 sets the keylock function according to the contents of the keylock setting button. Because of this, the keylock function is validated.

When a processing to set the keylock function is assigned to the hard key 37, and that hard key 37 is pressed by the user, the CPU 100 executes the keylock function by receiving the input signal from the key input circuit 303.

Further, the CPU 100 observes the positional signal from each touch sensor 12, 22 and the input signal from key input circuit 303, and measures an elapsed time after the input to the display surfaces 11a1, 21a1 and the key input circuit 303 has stopped based on signals from the clock 311. When the measured time passes the predetermined time, the CPU 100 executes the keylock function.

When the CPU 100 sets the keylock function, input from the user via each touch sensor 12 and 22 is disabled. On the other hand, when the CPU 100 released the keylock function, the CPU 100 accepts input from the user and executes the processing according to the input.

The above disablement of the input is, for example, disablement of input by the CPU 100's not accepting the input by each touch sensor 12 and 22, or disablement of input by the CPU 100's not executing the processing based on the input detected by each touch sensor 12 and 22.

The CPU 100 outputs control signals to video decoder 306 and a backlight drive circuit 305 based on the control of the function controlling module and the input by the user operation. For example, when the keylock function is set, the CPU 100 controls the backlight driving circuit 305, and turns off each backlight 11b and 21b. On the other hand, when the user pressed the hard key 37, the CPU 100 lights up each backlight 11b and 21g, and controls video decoder 306 to display the images on each display surfaces 11a1 and 21a1. The images are constructed by information such as still images, videos, characters and symbols, etc. The CPU 100 controls contrast, brightness, size of the screen, transparency of the screen, etc., when the image is displayed on each display surface 11a1 and 21a1.

<Procedures for Processing of the First Embodiment>

Figure 5:
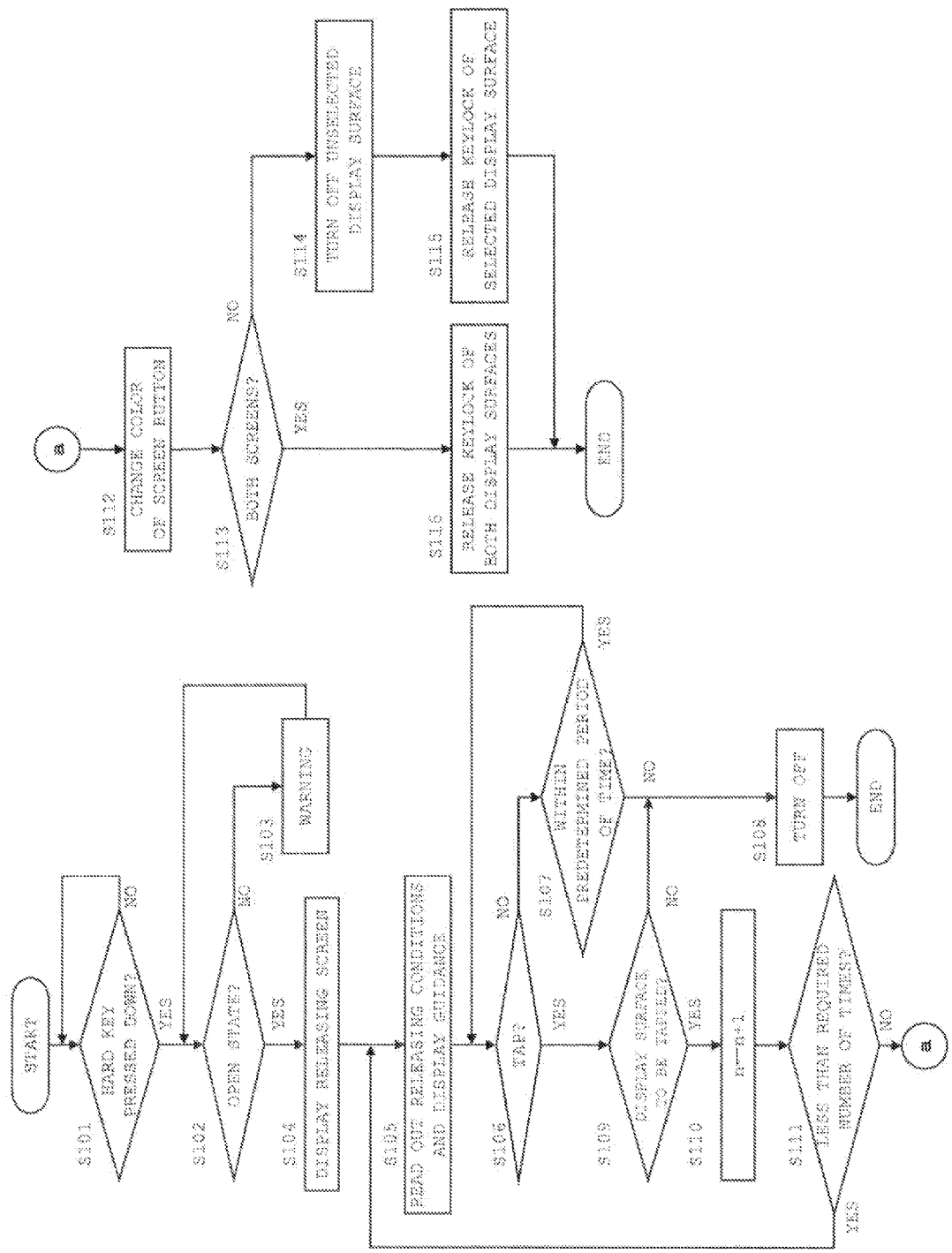
FIG. 5 is a flow chart showing a procedure for processing to release a keylock function according to the embodiment.

FIG. 4 (*a*) is a diagram showing an operation menu screen including the keylock setting button displayed on each display surface 11a1 and 21a1. FIG. 4 (*b*) is a diagram showing each screen to release the keylock function displayed on each display surface 11a1 and 21a1. FIG. 5 is a flow chart showing procedures for processing to release the keylock function.

In the first embodiment, mainly the keylock function for preventing malfunctioning is explained.

As shown in FIG. 4 (*a*), the first screen is displayed on the first display surface 11a1. The first screen includes images of buttons indicating items to be operated such as telephone, internet and e-mails. The second screen is displayed on the second display surface 21a1. The second screen includes images of buttons indicating items to be operated such as camera, schedule and keylock setting.

When the user touches the position of the keylock setting button displayed on the second display surface 21a1, the second touch sensor 22 detects the touched position in the second display surface 21a1, and outputs the positional signal according to the detected position to the CPU 100. When the CPU 100 receives the positional signal from the second touch sensor 22, the CPU 100 refers to image-position corresponding information of the memory 200, and specifies the contents of the image corresponding to the positional signal. In this case, the contents of the image is the setting for the keylock function, the CPU 100 executes the keylock function and disables inputs from each touch sensor 12 and 22. The CPU 100 controls the backlight driving circuit 305 and turns off each backlight 11b and 21b. Because of this, a power saving function to suppress electric consumption in the cellular phone 1 is validated.

Next, referring to FIG. 5, a releasing processing of the keylock function is explained. In the present embodiment, a releasing condition of the keylock function is set to include "after 2 taps to the tapping area of the first screen, 3 taps to the tapping area of the second screen" are required. The following description explains the releasing processing of the keylock function by using this releasing condition as an example when relevant for convenience.

In a state where the keylock function and the power saving function are set, when the user presses the hard key 37, the CPU 100 determines that the hard key 37 is pressed down (S101: YES). For this reason, only the power saving function is released. Then, the CPU 100 measures elapsed time since the hard key 37 being held down using the signal from the clock 311 to determine whether the input to release the keylock will be done within the predetermined time or not.

Then, the CPU 100 determines whether the cellular phone 1 is keeping the open state or not based on the signals from the close sensor 25 and the open sensor 26 (S102). The CPU 100 determines that the cellular phone 1 is in the closed state when the CPU 100 receives a signal from the closed sensor 25, that is, the cellular phone 1 is not in the open state (S102: NO). In the closed state, only the first display surface 11a1 appears outside, and the second display surface 21a1 is hidden. Thus, the user cannot use both of the display surfaces 11a1 and 21a1 at the same time. Then, the CPU 100 displays a warning such as "please open the cellular phone" on the first display surface 11a1 (S103). Because of this, the user is prompted to open the cellular phone 1 from the closed state to the open state.

When the cellular phone 1 takes the state of the open state (S102: YES), as shown in FIG. 4(*b*), the CPU 100 displays releasing screens to release the keylock function on each display surface 11a1 and 21a1 (S104). The first screen includes the screen buttons written top screen, bottom screen and both screens. When the top screen button is selected after the releasing operation which fulfills the releasing conditions were performed, the keylock function for the input to the first display surface 11a1 is released. Alternatively, when the bottom button is selected, the keylock function for the input to the second display surface 21a1 is released. Or, when the both screens button is selected, the keylock function for the input to both the first display surface 11a1 and the second display surface 21a1 is released. Each of the first screen and the second screen includes an image of an oblong showing the tapping area.

The CPU 100 reads out the condition of the first step among the releasing conditions of the keylock function from the memory 200 (S105). As the above, in the present embodiment, the releasing condition consists a total of five steps of "after tapping twice on the tapping area of the first screen, tapping three times on the tapping area of the second screen." Thus, the first step of the releasing condition is a tap on the tapping area of the first screen.

The CPU 100 changes colors of the tapping area of the first screen according to the condition of the first step (S105). For this reason, the user is induced to tap to the taping area of the first screen.

The CPU 100 monitors the positional signals from each touch sensor 12 and 22 (S106). When each display surface 11a1 or 21a1 is not touched, the CPU 100 does not receive the positional signal from each touch sensor 12 and 22. In this case, the CPU 100 determines that the tapping is not performed (S106: NO). Then, the CPU 100 determines whether the elapsed time since the hard key 37 has been held down is within the predetermined time or not (S107). If the elapsed time since the hard key has been held down is within the predetermined time (S107: YES), the CPU 100 keeps monitoring the positional signal from each touch sensor 12 and 22 (S106). On the other hand, if the elapsed time passes the predetermined time (S107: NO), the CPU 100 determines that the inputs from the hard key 37 is held down to the keylock function is released are not performed in sequence. Then, the CPU 100 turns off each backlight 11b and 21b (S108) and terminates the processing.

In contrast, when the CPU 100 receives the positional signal from each touch sensor 12 and 22, the CPU 100 determines that the touch has been performed on each display surface 11a1 and 21a1. Subsequently, the CPU 100 determines whether the touch is a tap or not. In concrete, the CPU 100 receives a signal from the clock 311 and measures the time from the touch to the release. If the measured time is longer than the predetermined time, the CPU 100 determines that the touch was not the tap (S106: NO). In this case, since the touch is not the tap, the CPU 100 continues to monitor the elapsed time, and when the elapsed time passes the predetermined time, the CPU 100 turns off each backlight 11b and 21b (S108) and terminates the processing.

On the other hand, if the time from the touch to the release is short, the CPU 100 determines that the touch was a tap (S106: YES). Then, the CPU 100 determines whether the positional signal is input by the first touch sensor 12 or the second touch sensor 22 (S109). If the CPU 100 has received the positional signal from the second touch sensor 22, the CPU 100 determines that the second screen of the second display surface 21a1 was tapped (S109: NO). Since tapping on the second screen does not match the first step of the releasing condition of tapping on the first screen, the CPU 100 turns off each backlight 11b and 21b (S108) and terminates the processing.

In contrast, if the CPU 100 has received the positional signal from the first touch sensor 12, the CPU 100 determines that the first screen of the first display surface 11a1 was tapped. Secondly, the CPU 100 compares the position according to the positional signal from the first touch sensor 12 and the position in the tapping area of the first screen to determine whether the tapped position is in the tapping area of the first screen. If the position according to the positional signal was not inside the position of the tapping area, the CPU 100 determines that the tapped position was outside the tapping area (S109: NO). This does not match the releasing condition, the CPU 100 turns off each backlight 11b and 21b (S108) and terminates the processing.

If the position by the first touch sensor 12 was inside the position of the tapping area, the CPU 100 determines that the tapped position was inside the tapping area (S109: YES).

Then, the CPU 100 adds "1" to the tapped number n (S110). When the tapped number was "0," the added number would be "1." When the tapped number was less than 5 (S111: YES), the processing returns to the step S105. When the releasing screen is displayed at S104, the number n is set to the initial value of 0.

The CPU 100 reads out the condition for the second step of the keylock releasing conditions from the memory 200. As in the above, the second step of the releasing conditions is a tap to the tapping area of the first screen. The CPU 100 changes colors of the tapping area of the first screen according to the condition of the second screen (S105). Then, within the predetermined time (S107: YES), the CPU 100 determines whether the first display surface 11a1 is tapped or not (S106, S109). If the tap to the first display surface 11a1 was repeated (S105: YES, S108: YES), the CPU 100 adds 1 to the tapped number (S110), and determines that the tapped number is 2 (S111: NO).

The processing from the above S105 to S111 is repeated for the number of times the steps in the releasing condition. As the above, in the present embodiment, the number of steps in the releasing condition is set to be 5 times (2 taps to the tapping area of the first screen and three taps to the tapping area of the second screen). The rest three steps are all taps to the tapping area of the second screen. The number of taps counted up at S110 becomes 5 times, and when the processing from S105 to S111 is repeated for the number of times the steps in the releasing condition (S111: YES), the CPU 100 changes the colors of the three screen buttons shown in FIG. 4 (b) (S112). For this reason, the user is guided to select one of the three screen buttons.

The CPU 100 monitors the positional signal from the first touch sensor 12 (S113). When one of the three screen buttons is selected, the CPU 100 receives the positional signal from the first touch sensor 12 and specifies the position according to the positional signal received. The CPU 100 obtains contents of the button corresponding to the specified position from the image-position corresponding information of the memory 200.

When the selected button information is not for both screens (S113: NO), the CPU 100 turns off the backlight of unselected display surface (S114) and releases the keylock function corresponding to the selected display surface (S115). For example, if the selected screen button was for the upper screen, the CPU 100 turns off the backlight of the second display surface 21a1 and releases the keylock function corresponding to the first display surface 11a1. If the selected screen button was for the bottom screen, the CPU 100 turns off the backlight of the first display surface 11a1 and releases the keylock function corresponding to the second display surface 21a1.

On the other hand, when the selected button information was for the both screens (S113: YES), the CPU 100 releases the keylock function corresponding to the first display surface 11a1 and the second display surface 21a1 (S116).

According to the present embodiment, based on a series of the tapping operations done to the two display surfaces 11a1 and 21a1, release of the keylock function is determined. As such, both of the display surfaces being tapped with a series of steps are hard to happen unless the operation was intended. For this reason, it can be more accurately determined whether the input was performed to both of the display surfaces according to the releasing conditions of the keylock function or not. Therefore, it can further and certainly prevent a false operation caused by an unintentional input by the user.

According to the present embodiment, the user can select which display surface to release the keylock function. For this reason, the keylock function for not selected display surface is not released but kept set, and the input to the display surface is disabled. For this reason, regarding the display surface that the keylock function is not released but still valid, remains prevented the false operation caused by an unintentional input. Further, since the display surface, whose keylock function is still valid, remains its light turned off, the electric consumption can be reduced.

The Second Embodiment

In the cellular phone 1 of the second embodiment, a keylock function for preventing misuse is mainly explained. For the purpose of preventing misuse, the condition for releasing the keylock function doubles the condition for authenticate the use of the cellular phone 1. For this reason, in this embodiment, the condition for releasing the keylock function for the purpose of preventing the misuse is called a releasing condition with authentication.

The CPU 100 is as a function control module, creates a releasing condition with authentication based on one or both of an input signal from the first touch sensor 12 and an input signal from the second touch sensor 22, and stores in the memory 200.

Figure 6:
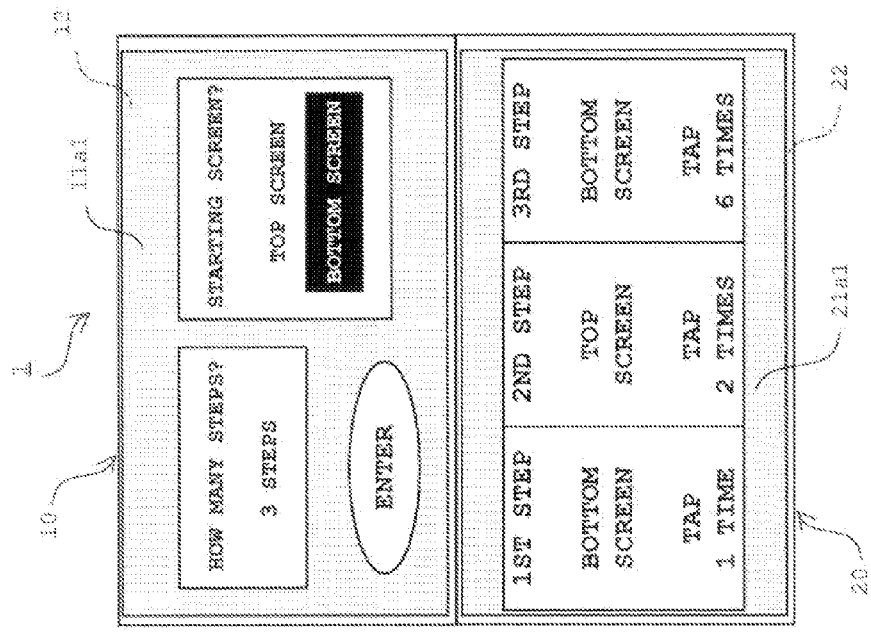
FIG. 6 is a diagram showing screens displayed on each display surface according to the embodiment.

FIG. 6 displays the screen for setting releasing conditions with authentication.

The first screen is displayed on the first display surface 11a1. The first screen includes images indicating "how many steps?," "Enter" and "starting screen?" The image of "how many steps?" shows an area to input the number of steps for the releasing condition with authentication. When this input area of the step number is touched, the first touch sensor 12 detects the touched position and inputs the positional signal according to the touched position to the CPU 100. The CPU 100 refers to the image-position corresponding information of the memory 200 and determines whether the number of steps for releasing condition with authentication is input or not from the positional signal input. Every time the input area of the number of steps is touched, the CPU 100 displays the number of the steps in the input area by increasing the number of the steps one by one. For example, when the input area of the number of steps is touched for three times, the CPU 100 displays three steps. Then, the image of "Enter" is touched, the CPU 100 determines that the operation for decision was performed from the image-position corresponding information according to the positional signal from the first touch sensor 12. Because of the above, the number of steps for the releasing condition with authentication is decided to be three times.

The image of "starting screen?" shows the area to input which of the top screen or the bottom screen will hold the processing in the first step of the releasing condition with authentication. For example, in the input area of the starting screen, a position of the bottom screen is touched, the CPU 100 receives the positional signal based on the touched position from the first touch sensor 12. The CPU 100 refers to the image-position corresponding information of the memory 200 and determines that the bottom screen was selected from the positional signal input. Then, when the image of "Enter" is touched, the CPU 100 determines that the operation for decision was performed from the positional signal from the first touch sensor 12. Because of this, it is decided that the input area of the first step of the releasing condition with authentication is the bottom screen.

In this example, "the number of steps for the releasing condition with authentication: 3 steps" and "starting screen: bottom screen" are decided, so the second screen for deciding the contents of each step is displayed on the second display surface 21a1. On the second screen, input areas for the first to third steps are provided. Since the starting screen is the bottom screen, the input area of the first step is displayed "bottom screen." The input area for the next second step is displayed "top screen," and further input area for the third step is displayed "bottom screen."

When the input area of the first step is touched, the CPU 100 receives the positional signal from the second touch sensor 22. The CPU 100 determines that the input area of the first step is touched from the positional signal based on the image-position corresponding information. The CPU 100 determines the number of times the input area of the first step is touched as tapped number and displays the tapped number in the input area of the first step. Similarly, the number of times tapped in the input areas of the second and the third step is counted by the CPU 100, and the number of times tapped is displayed in each input area. The example of FIG. 6, the input area of the first step is touched once, the number of times tapped on the bottom screen is input as once. Since the input area of the second step is touched twice, the number of tapped on the top screen is input as twice. Since the input area of the third step is touched for six times, the number of times tapped on the bottom screen is input as six times.

After the number of times tapped on each step is input, and then the image "Enter" is touched, the CPU 100 receives the positional signal from the first touch sensor 12 and determines that the operation of decision has made. For this reason, the CPU 100 sets the components of each step in the releasing condition with authentication and stores the releasing condition with authentication in the memory 200.

Figure 7:
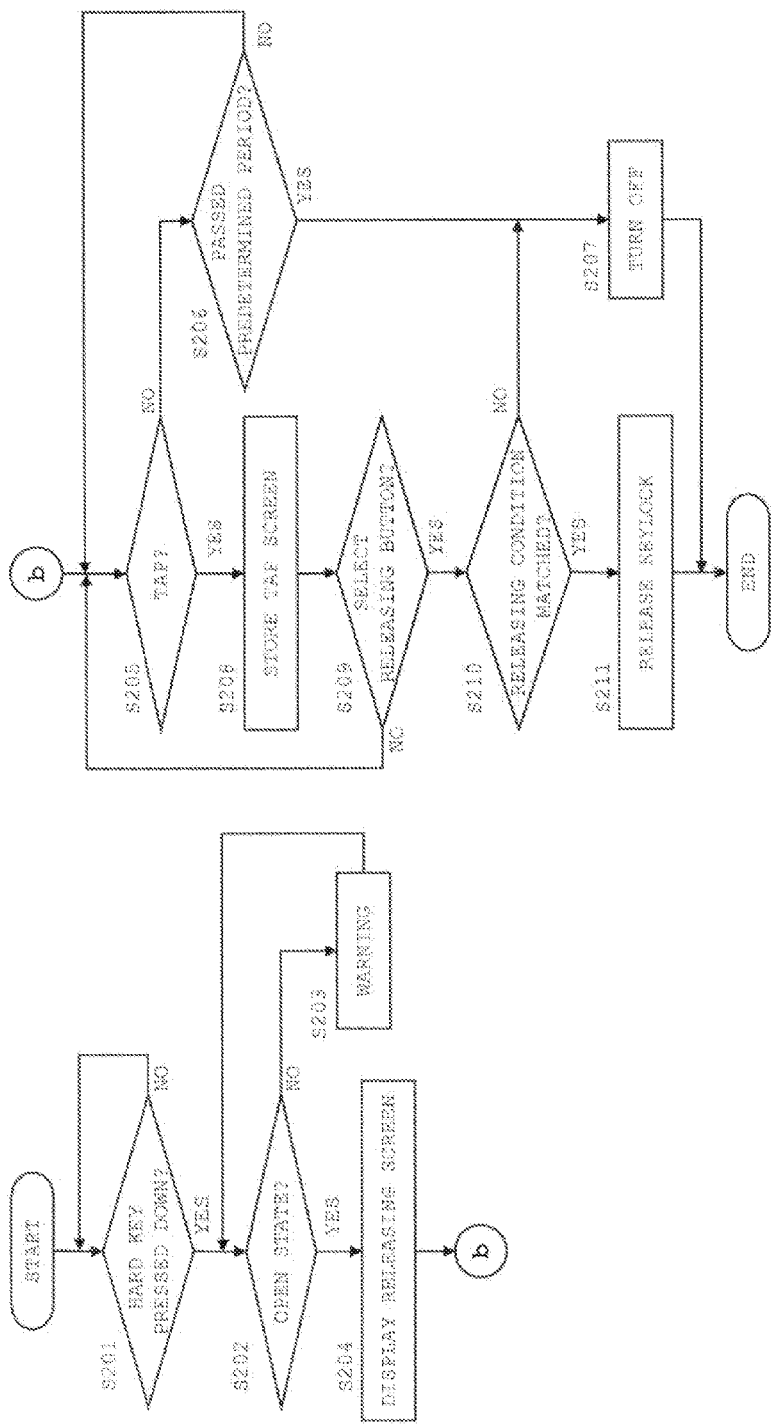
FIG. 7 is a flowchart showing a procedure for processing to release a keylock function with authentication according to the embodiment.
Figure 8:
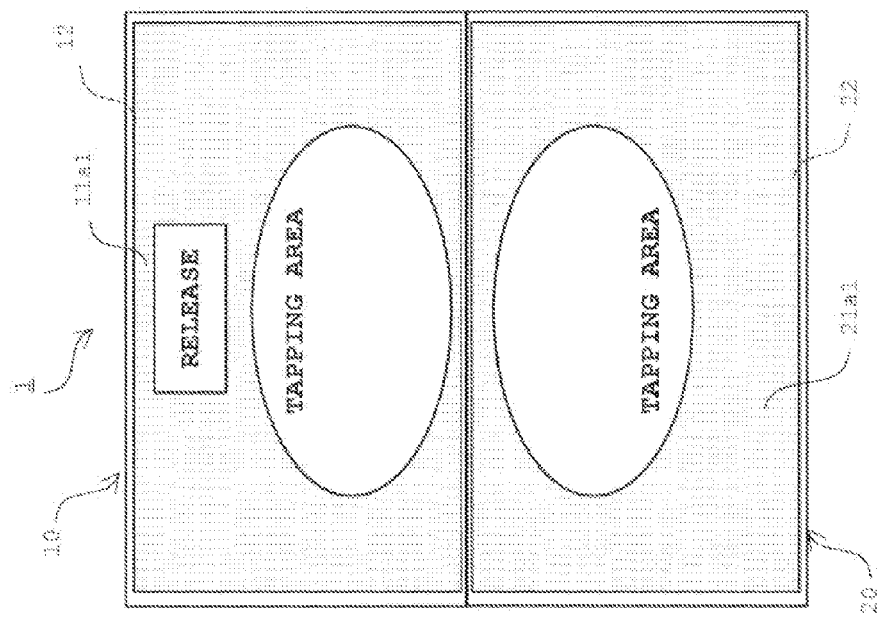
FIG. 8 is a diagram showing screens displayed on each display surface according to the embodiment.

FIG. 7 is a flow chart showing procedure for processing to release the keylock function according to the releasing conditions with authentication. FIG. 8 is a diagram showing each screen to release the keylock function shown on each display surface 11a1 and 21a1.

Referring to FIG. 7, in a state that the keylock function and power saving function are valid, when the hard key 37 is pressed, the CPU 100 determines that the hard key 37 was pressed down (S201: YES). To determine whether the input for the keylock release is made within the predetermined time or not, the CPU 100 starts measuring the elapsed time from pressing down the hard key 37 by using the signal from the clock 311.

If the CPU 100 has received a signal from the close sensor 25, the CPU 100 determines that the cellular phone 1 is in a closed state (S202: NO). The CPU 100 displays a warning for the cellular phone 1 to prompt to adopt an open state (S203). If the CPU 100 has received a signal from the open sensor 26, the CPU 100 determines that the cellular phone 1 is adopting the open state (S202: YES).

When the cellular phone 1 is in the open state, the CPU 100 displays the screens to release the keylock function shown in FIG. 8 on each display surface 11a1 and 21a1 (S204). As shown in FIG. 8, the first screen includes an image of a releasing button and an image of a tapping area. The second screen includes an image of the tapping area. Contents and positions related to these images are stored in the memory 200 as the image-position corresponding information.

When the CPU 100 receives the positional signal from each touch sensor 12 and 22, the CPU 100 determines that each display surface 11a1 and 21a1 was touched. Then, the CPU 100 compares the touched position based on the positional signal and the position of the tapping area defined in the image-position corresponding information. If the touched position was in the tapping area, the CPU 100 measures the time from the touch to the release based on the signal from the clock 311, and when the measured time was long, the CPU 100 determines that it was not a tap (S205: NO).

When the tap was not detected, if the elapsed time from the pressing down of the hard key 37 is within the predetermined time (S206: NO), the CPU 100 monitors the positional signal from each touch sensor 12 and 22 and determines whether there is a tap or not (S205). On the other hand, when the CPU 100 determines that the elapsed time after the hard key 37 was pressed down has exceeded the predetermined time (S206: YES), since the series of the tap operation to release the keylock function was not done, the CPU 100 turns off each backlight 11b and 21b (S207). For this reason, while the keylock function is still valid, the power saving function is again executed.

When the tap was detected (S205: YES), the CPU 100 determines whether the tapped screen was either the top screen or the bottom screen based on the positional signal from each touch sensor 12 and 22. Then, the CPU 100 stores the information showing that the tapped screen was one of the top or bottom screens in the memory 200 in order that tapped (S208).

Next, when the CPU 100 receives the positional signal from the first touch sensor 12, the CPU 100 determines whether the touched position showing the positional signal corresponds to the position of the releasing button or not based on the image-position corresponding information. If the touched position was not the position of the releasing button, the CPU 100 determines that the releasing button was not selected (S209: NO). Then, the CPU 100 repeats the processing of S205-S209.

When the touched position matches the position of the releasing button, the CPU 100 determines that the releasing button was selected (S209: YES). With this action, the input for releasing the keylock function by the user is ended.

The CPU 100 determines whether the order of the tapped screen matches the releasing conditions with authentication set by the function control module or not (S210). When these are not matched (S210: NO), the CPU 100 determines that the information input to each display surface 11a1 and 21a1 does not fulfill the releasing conditions with authentication, turns off the backlights of each display surface 11a1 and 21a1 and terminates the processing.

In contrast, if the order of the tapped screen matches the releasing conditions with authentication (S210: YES), the CPU 100 releases the keylock function to both the first display surface 11a1 and the second display surface 21a1 (S211). This makes the input to the first touch sensor 12 and the second touch sensor 22 valid, and the user becomes capable of using the cellular phone 1.

According to the present embodiment, the user inputs the information for authentication related to usage of the cellular phone 1 and for releasing the keylock function by tapping two display surfaces 11a1 and 21a1. As such, by being used the both display surfaces 11a1 and 21a1 to input the information, the input done can be determined more certainly that it is not incidental. Thus, according to the user's intention, improvement of a security while using the cellular phone 1 is planned.

According to the present embodiment, based on the input done to the two touch sensor 12 and 22, the releasing condition with authentication is set.

Other Embodiment

The embodiment of the present invention has been described above, but the present invention is not limited to the above embodiment, and the embodiment of the present invention may be variously modified.

For example, in the first embodiment, the releasing conditions of the keylock function are previously decided, however the user can set the releasing conditions arbitrarily. It can be constructed for the user to choose the releasing conditions from a plurality of releasing conditions previously set.

Further, in the first embodiment, as shown in FIG. 4 (b), on the first screen where inputs for releasing the keylock function are performed, buttons to select the screen where the keylock function is released are displayed. In contrast, a construction that does not display the image of the buttons can be chosen. In this case, when the CPU 100 determines that S111 of FIG. 5 is YES, the CPU 100 releases the keylock function to the both display surfaces 11a1 and 21a1, and because of this, inputs to the two display surfaces 11a1 and 21a1 become valid. That is, whenever S111 of FIG. 5 is determined to be YES, the processing can always move to S116.

Alternatively, it can be constructed that after it is determined YES at S111 of FIG. 5, within a predetermined time if either of the display surfaces 11a1 or 21a1 is touched, the keylock function only for the display surface touched is released. In this case, if the both display surfaces 11a1 and 21a1 are touched within the predetermined time, the keylock function for both display surfaces is released. When neither of the display surfaces 11a1 or 21a1 was touched within the predetermined time, the keylock function for both display surfaces is released. Also, in this case, the screen selecting button is omitted from the display of FIG. 4(b). A processing for notifying the user that the keylock function will be released from the display surface touched by audio output, etc., can be further performed.

In the first embodiment, the button to select the screen to release the keylock function is displayed on the first screen as shown in FIG. 4 (b). On the other hand, the button to select the screen to release the keylock function can be displayed on the second screen, or can be displayed on both the first screen and the second screen.

Further, in the first modification, to prompt the user to tap to the tapping area, the color of the tapping area was changed, however a means to prompt the user to tap is not limited to the means above. For instance, the CPU 100 can prompt the user to tap the tapping area by adopting the construction to execute a processing of changing a state of the tapping area by changing the shape of the tapping area, switching back and forth from display to hide the tapping area, and so on.

In the second embodiment, the releasing conditions of the keylock function are set at the discretion of the user. However, the releasing conditions of the keylock can be defined in advance. It can be constructed for a user to choose a desired releasing condition from a plurality of releasing conditions by proposing the plurality of previously set releasing conditions to the user.

In the second embodiment, as shown in FIG. 6, screens to set the releasing conditions to release the keylock function was displayed on both display surfaces 11a1 and 21a1. However, the screen to set the releasing conditions to release the keylock function can be displayed only on the first display surface 11a1 or the second display surface 21a1.

Further, in the second embodiment, when the releasing condition with authentication is set, the top screen and the bottom screen are set as screens to be tapped alternately. In contrast, it can be constructed for the user to set the screen to be tapped arbitrarily.

In the second embodiment, when input information fulfilled the releasing condition, the keylock function for both display surfaces 11a1 and 21a1 is released. In contrast, for example, as in the first embodiment, it may choose to construct to be able to select the display surface on which the key lock function is released.

Figure 9:
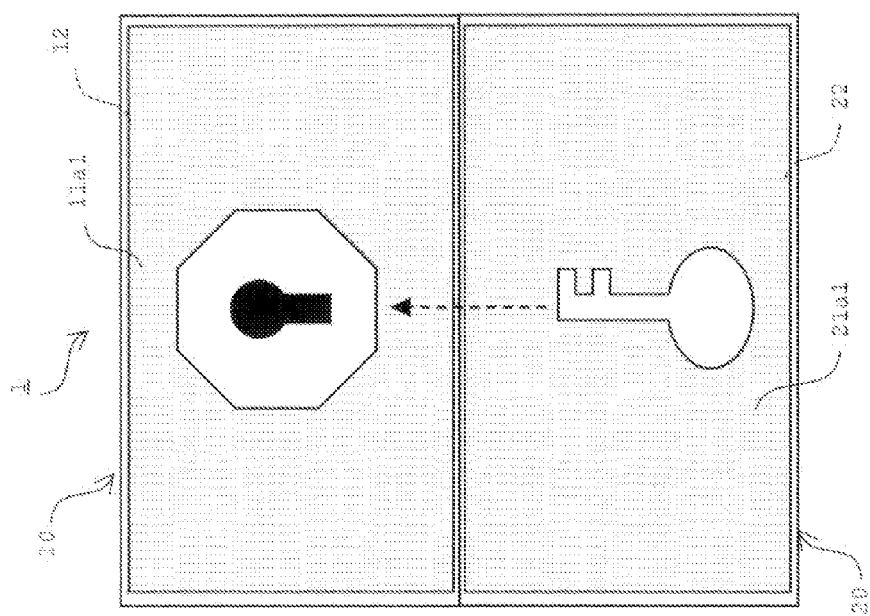
FIG. 9 is a diagram showing images displayed on each screen according to a modification example.

In the above embodiment, although the image of the tapping area is displayed on the screen for releasing the keylock function, it should not be limited to that, and an image the user can easily comprehend can be used. For example, as shown in FIG. 9, a construction that an image of a key and an image of a lock being displayed on the releasing screen of the keylock function can be taken. In the construction, when the user touches the image of the key and moves the touched position, the CPU 100 moves the image of the key according to the movement of the touched position. When the position of the image of the key reached the position of the image of the lock, the CPU 100 determines that the releasing condition of the keylock function is fulfilled and releases the keylock function. In this case, one of the first screen and the second screen includes the image of the key at first (before the move), and the other includes the image of the lock.

In the above embodiment, the releasing condition of the keylock function for the first display surface 11a1, the releasing condition of the keylock function for the second display surface 21a1 and the releasing condition of the keylock function for both of the display surfaces 11a1 and 21a1 are the same. In contrast, each releasing condition can be set separately. In this case, when an input which fulfills each releasing condition is made, the keylock function of the display surface corresponding to the fulfilled releasing condition is released.

In the above embodiment, the releasing conditions can include a step to tap the top screen or a step to tap the bottom screen. The releasing conditions can be set to include a step to tap the top screen and the bottom screen at the same time. The simultaneous tap to the top screen and the bottom screen hardly occurs by chance. Thus, the tap to the both screens is set to be a step for the releasing conditions, the release of the keylock function according to the user's intention can be determined with increased accuracy.

Further, in the above embodiment, the keylock function for the both touch sensors 12 and 22 are set, and tapping areas are displayed on both of the display surfaces 11a1 and 21a1. On the other hand, when the keylock function is set for the first touch sensor 12, the tapping area can be displayed on the second display surface 21a1. In contrast, when the keylock function is set for the second touch sensor 22, the tapping area can be displayed on the first display surface 11a1. In this case, when the input to the touch sensor which is not set with the keylock function matches the releasing condition, the keylock function for the other touch sensor is released.

In the above embodiment, an order and the number of times of the tap to the tapping area of both the display surfaces 11a1 and 21a1 are set as the releasing condition, however only either one of them is fine. For instance, when tapping each tapping area once each, the order to tap on the tapping area of both display surface 11a1 and 21a1 are set to be the releasing condition. Alternatively, regardless of the order of tapping the tapping areas of both the display surfaces 11a1 and 21a1, only the number of tapping to each tapping area is set as the releasing condition.

Further, in the above embodiment, a tapping action is considered the releasing condition, however the releasing condition does not need to be limited to the condition related to the tapping action. For example, the releasing condition can be a sliding action which moves the touched position, a flick action which moves the touched position in a short period of time for more than a predetermined distance, and so forth. For instance, when the sliding action is performed and the CPU 100 receives inputs from each touch sensor 12 and 22 that moves the touched position for more than the predetermined distance (e.g. 50 pixel), the CPU 100 determines that the input to release the keylock function is performed. When the flick action is performed and the CPU 100 receives inputs from each touch sensor 12 and 22 that moves the touched position within a predetermined time (e.g. 0.5 ms) for more than the predetermined distance (e.g. 50 pixel), the CPU 100 determines that the input to release the keylock function is performed.

In the above embodiment, when the user touched the keylock setting button displayed on the first display surface 11a1, the user pressed the hard key 37 to set the keylock function, or there was no input signal from each touch sensor 12, 22 and the key input circuit 303 for more than the predetermined time, the CPU 100 sets the keylock function. However, it can be constructed to set the keylock function based on the operation other than the operations described above. For example, the keylock function can be set when the power key 36 was pressed continuously for the predetermined number of times, the power was switched from OFF to ON, each cabinet 10 and 20 were switched from open state to closed state, etc.

Further, in the above embodiment, if there was an incoming call while the keylock function is set, an input for answering the call can be accepted. In this case, the input other than answering the incoming call cannot be accepted.

Furthermore, in the above embodiment, two touch panels were provided on the cellular phone, however more than three touch panels can also be provided.

In the above embodiment, the cellular phone 1 is used, however, other portable terminal devices such as a PDA, a potable game machine, etc., can be used.

The embodiment of the present invention may be modified variously and suitably within the scope of the technical idea described in claims. For example, part or all of the above embodiment can be combined.

REFERENCE SIGNS LIST 1 cellular phone
11 First display
11b First backlight
12 First touch sensor
21 Second display
21b Second backlight
22 Second touch sensor
100 CPU
200 Memory

The invention claimed is:

1. A portable terminal device, comprising:
a first display module comprising a first display surface;
a second display module comprising a second display surface;
a first detecting module which detects an input to the first display surface;
a second detecting module which detects an input to the second display surface;
a function control module which sets and releases a keylock function for disabling the first detecting module and the second detecting module; and
a storage module which stores a releasing condition for releasing the keylock function, the releasing condition including a combination of inputs, wherein the combination of inputs includes an ordered sequence of two or more steps, wherein a first one of the two or more steps comprises a number of inputs to one of the first and second display surfaces, and wherein a second subsequent one of the two or more steps comprises a number of inputs to a different one of the first and second display surfaces than the first step,
wherein the function control module releases the keylock function with respect to at least one of the first detecting module and the second detecting module when a sequence of inputs detected by the first and second detecting modules match with the releasing condition stored in the storage module while the keylock function is being set,
wherein the function control module turns off the second display module when the keylock function with respect to the first detecting module, among the first detecting module and the second detecting module, is released,
wherein the function control module turns off the first display module when the keylock function with respect to the second detecting module, among the first detecting module and the second detecting module, is released, and
wherein the releasing condition includes an input in which one of the first display module and the second display module is touched, and the touched position is moved to the other display module while the touch is kept.

2. The portable terminal device according to claim 1, wherein the function control module executes a processing to receive an operation for selecting for which of the first detecting module and the second detecting module the keylock function is to be released, when the input detected by the first detecting module and the input detected by the second detecting module match with the releasing condition stored in the storage module.

3. The portable terminal device according to claim 1, wherein the function control module further executes processing to receive a setting of the releasing condition.

4. The portable terminal device according to claim 1, wherein each of the inputs in both the first and second steps comprises a tap.

5. The portable terminal device according to claim 1, wherein the two or more steps comprise three or more steps, and wherein a third subsequent one of the three or more steps comprises a number of inputs to a different one of the first and second display surfaces than the second step.

6. The portable terminal device according to claim 1, wherein the function control module:
displays one or more screens for receiving the releasing condition from a user;
receives the releasing condition from the user via the one or more screens; and
stores the releasing condition in the storage module.

7. A method for releasing a keylock function of a portable terminal device comprising a first display module, a second display module, a first detecting module which detects an input to the first display module, and a second detecting module which detects an input to the second display module, the method for releasing a keylock function comprising:
in a state that a keylock function for disabling inputs to the first display module and the second display module is set, releasing the keylock function with respect to at least one of the first detecting module and the second detecting module, when a combination of inputs detected by the first detecting module and the second detecting module matches with a previously set releasing condition, wherein a combination of inputs of the set releasing condition comprises an ordered sequence of two or more steps, wherein a first one of the two or more steps comprises a number of inputs to one of the first and second display modules, and wherein a second subsequent one of the two or more steps comprises a number of inputs to a different one of the first and second display modules than the first step;
wherein the second display module is turned off when the keylock function with respect to the first detecting module, among the first detecting module and the second detecting module, is released, wherein the first display module is turned off when the keylock function with respect to the second detecting module, among the first detecting module and the second detecting module, is released, and
wherein the set releasing condition comprises a touch on one of the first display module and the second display module, and the touched position is moved to the other display module while the touch is kept.

* * * * *